BEST AVAILABLE COPY
I. JENNINGS.
Vapor Burner.
No. 4.
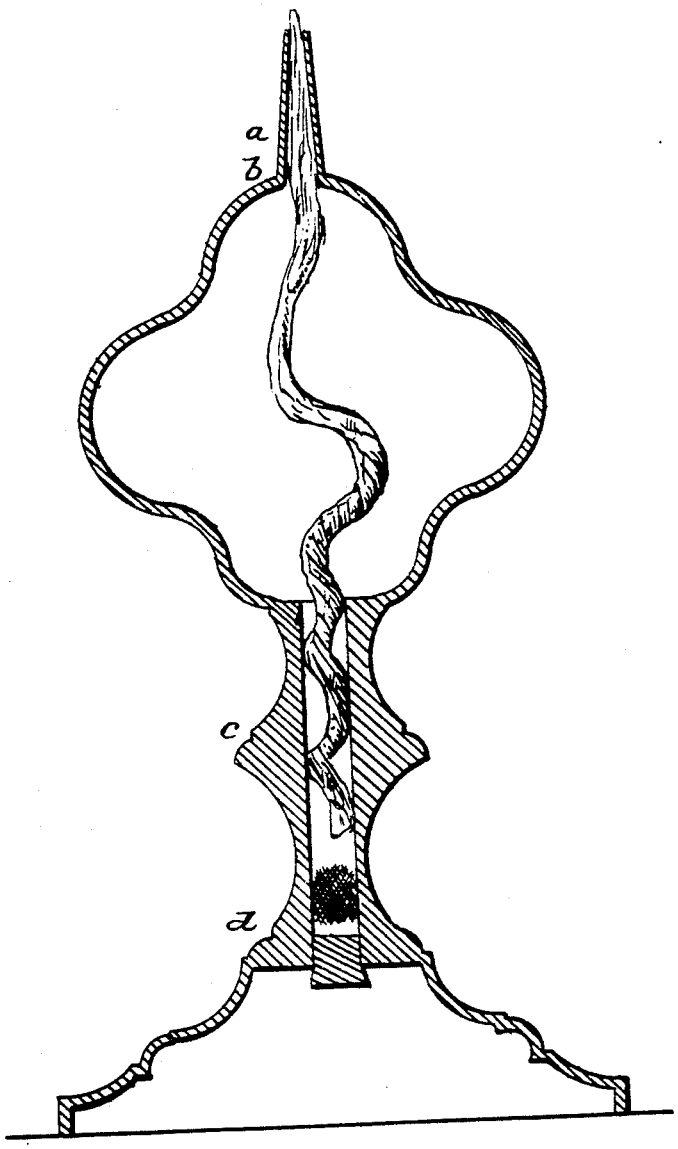
A. I. Patented March 15, 1838.